(12) United States Patent
Szczepanek et al.

(10) Patent No.: US 7,123,833 B2
(45) Date of Patent: Oct. 17, 2006

(54) DYNAMICALLY RECONFIGURABLE OPTICAL SMART NODE

(75) Inventors: Paul Szczepanek, Middletown, CT (US); Jay W. Dawson, Livermore, CA (US); John A. Moon, Wallingford, CT (US); Michael A. Davis, Glastonbury, CT (US)

(73) Assignee: CiDRA Corporation, Wallingford, CT (US)

( * ) Notice: Subject to any disclaimer, the term of this patent is extended or adjusted under 35 U.S.C. 154(b) by 654 days.

(21) Appl. No.: 10/216,000

(22) Filed: Aug. 8, 2002

(65) Prior Publication Data

US 2003/0053175 A1 Mar. 20, 2003

Related U.S. Application Data

(60) Provisional application No. 60/354,794, filed on Feb. 6, 2002, provisional application No. 60/310,991, filed on Aug. 9, 2001.

(51) Int. Cl.
*H04B 10/08* (2006.01)
(52) U.S. Cl. ........................................ 398/33
(58) Field of Classification Search ................ 398/33, 398/81–83, 177
See application file for complete search history.

(56) References Cited

U.S. PATENT DOCUMENTS

| | | | |
|---|---|---|---|
| 4,790,566 A | 12/1988 | Boissier et al. | |
| 5,208,880 A | 5/1993 | Riza et al. | |
| 5,312,513 A | 5/1994 | Florence et al. | |
| 5,745,260 A | 4/1998 | Blazey | |
| 5,822,222 A | 10/1998 | Kaplinsky et al. | |
| 5,870,173 A | 2/1999 | Oberhardt et al. | |
| 5,923,036 A | 7/1999 | Tague, Jr. et al. | |
| 6,061,171 A | 5/2000 | Taylor et al. | |
| 6,249,365 B1 | 6/2001 | Mizrahi et al. | |
| 6,263,123 B1 | 7/2001 | Bishop et al. | |
| 6,275,322 B1 | 8/2001 | Tai | |
| 6,344,910 B1 | 2/2002 | Cao | |
| 6,483,631 B1* | 11/2002 | Cheng et al. | 359/337.11 |
| 2002/0034356 A1 | 3/2002 | Tew | |
| 2002/0044722 A1 | 4/2002 | Tew | |
| 2002/0067887 A1 | 6/2002 | Tomlinson et al. | |
| 2002/0071627 A1 | 6/2002 | Smith et al. | |

FOREIGN PATENT DOCUMENTS

| | | |
|---|---|---|
| EP | 1205781 A1 | 5/2002 |
| EP | 1211534 A2 | 6/2002 |
| WO | 0101611 A3 | 1/2001 |

OTHER PUBLICATIONS

V. Aksyuk et al., "Low insertion loss packaged and fibre connectorised MEMS reflective optical switch", pp. 1413-1414, Electronics Letters, Jul. 9, 1998, vol. 34, No. 14.
T. Bergman et al., "Variable Optical Attenuator And Optical Multiplexing Subsystem Integration, Control, and Application", pp. 954-962, National Fiber Optic Engineers. Conference, 2001 Technical Proceedings.

(Continued)

*Primary Examiner*—David C. Payne

(57) ABSTRACT

A smart node is provided for use in an optical communications network wherein the smart node comprising dynamically reconfigurable optical signal manipulation devices in combination with sensing devices and processors to provide real time closed and open loop control of various channels of the network.

42 Claims, 10 Drawing Sheets

OTHER PUBLICATIONS

L. Zhang et al., Optical Node For Ultra-Long-Haul Backbone Networks, pp. 43-46, National Fiber Optics Engineers Conference, 2001 Technical Proceedings.

N.A. Riza et al., "Fault-tolerant dense multiwavelength add-drop filter with a two-dimensional digital micromirror device", pp. 6355-6361, Applied Optics, vol. 37, No. 27, Sep. 20, 1998.

Switching Time for Large-Scale Optical Crossconnects, pp. 525-527, IEEE Photonics Technology Letters, vol. 10, No. 4, Apr. 1998.

M. F. Dautartas et al., "A Silicon-Based Moving-Mirror Optical Switch", pp. 1078-1085 Journal of Lightwave Technology, vol. 10, No. 8, Aug. 1992.

N. A. Riza et al., "Two Dimensional Digital Micromirror Device-based 2×2 Fiber-Optic Switch Array", pp. 413-414, 11th Annual Mtg., IEEE Lasers and Electro-Optics, Dec. 1998.

N. A. Riza et al., "Fault-tolerant polarization-insensitive photonic delay line architectures using two-dimensional digital micromirror devices", pp. 312-321, Optics Communications, Nov. 29, 1998.

N. A. Riza et al., "Versatile multi-wavelength fiber-optic switch and attenuator structure using mirror manipulations", pp. 1-11, Optics Communications, Jul. 6, 1999.

S. Glöckner et al., "Micro-opto-mechanical beam deflectors", pp. 1339-1345, Optical Engineering, May 1997.

J. E. Ford et al., "Dynamic Spectral Power Equalization Using Micro-Opto-Mechanics", pp. 1440-1442, IEEE Photonics Technology Letters, vol. 10, No. 10, Oct. 1998.

B. Barber et al., "A Fiber Connectorized MEMS Variable Optical Attenuator", pp. 1262-1264, IEEE Photonics Technology Letters, vol. 10, No. 9, Sep. 1998.

Press Release, "Onetta Releases Technical Paper On Dynamic Gain Equalization And Its Role In Creating Economic Value For Network Service Providers", Sunnyvale, CA Jul. 16, 2001.

"Onetta Shipping 'Smart' Amplifiers," Light Reading-The Global Site For Optical Networking, Mar. 5, 2001.

Press-Releases, "Onetta Releases 'Smart' Amplifiers Creating the New 'Intelligent' Optical Engines' Product Category", San Jose, CA, Mar. 5, 2001.

N. A. Riza et al., "Small Tilt Micromirror Device-Based Multiwavelength Three Dimensional 2×2 Fiber-Optic Switch Structures," pp. 1-18 and Figure Captions, including Figs. 1-12, The School of Optics and Center For Research and Education in Optics and Lasers (CREOL), Published in the SPIE Journal Optical Engineering circa 1999/Early 2000.

\* cited by examiner

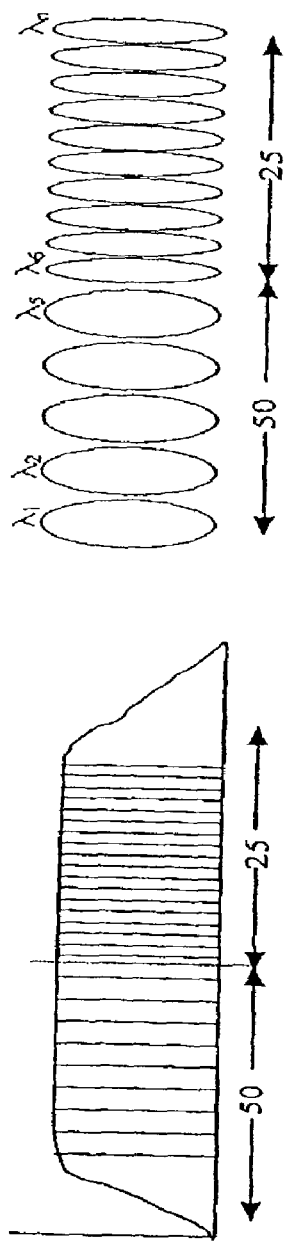
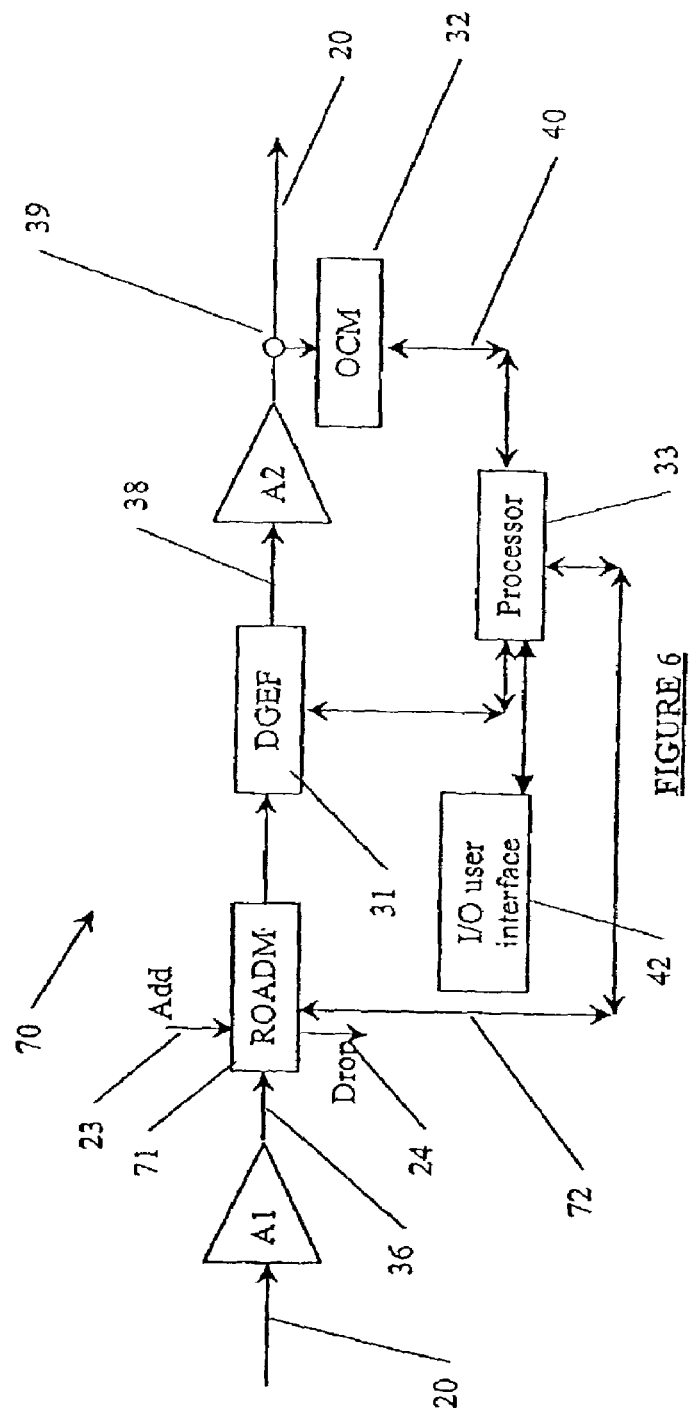
FIGURE 5
FIGURE 6

DYNAMICALLY RECONFIGURABLE OPTICAL SMART NODE

CROSS-REFERENCE TO RELATED APPLICATION

This application claims benefit to provisional patent application Ser. No. 60/310,991, filed Aug. 9, 2001, as well as 60/354,794, filed Feb. 6, 2002 (CiDRA file no. CC-0385).

BACKGROUND OF THE INVENTION

1. Field of the Invention

The invention relates to wavelength division multiplexed optical communication systems, and more particularly, to wavelength division multiplexed optical communication systems which include smart nodes having dynamic optical signal manipulation devices in combination with sensing devices and processors to provide real time closed and open loop control of various channels of the network.

2. Description of Related Art

Optical communication networks need links having nodes which include dynamically reconfigurable optical signal manipulation devices in combination with other sensing devices and processors to provide real time closed and open loop control of various channels of network.

SUMMARY OF THE INVENTION

The present invention provides a smart node for use in an optical communications network having optical signals. The smart node features continuous, real time, autonomous feedback and correction with closed and/or open loop control of the optical signals in the optical communications network.

The smart node may include (1) an input amplifier for amplifying the optical signals; (2) an equalization filter for filtering the optical signals in response to a feedback processor signal; (3) a coupler for coupling filtered optical signals; (4) a channel monitor for monitoring a feedback portion of the filtered optical signals; (5) a processor for processing a channel monitor signal from the channel monitor, and providing the feedback processor signal to the equalization filter; and (6) an output amplifier for amplifying the filtered optical signals and providing a dynamically reconfigurable filtered and amplified output signal.

The smart node may also include an input/output user interface for receiving input signals from an outside user and providing user input interface signals to the processor, and for receiving user output signals from the processor and providing user output interface signals to the user. For example, the input/output user interface may include an input user interface for receiving inputs from the outside user for dynamically changing the configuration of the smart node, including timing, traffic or other distinct attribute basis. The input/output user interface may include an output user interface for providing outputs containing information that may cause the outside user to dynamically change the configuration of the smart node. The outputs may include the power levels of various bands or channels, the band or channel spacing, channel drift, the degree of attenuation taking place, and along with other sensors or devices, the amount of dispersion/correction, empty channels, or a combination thereof.

In one embodiment, the output amplifier may be arranged after the coupler, while in an alternative embodiment the output amplifier may be arranged between the equalization filter and the coupler.

The optical signals may include different wavelengths, bands or channels, as well as wavelength division multiplexed signals having various levels of power.

The equalization filter may include a dynamic gain equalization filter that selectively attenuates one or more wavelengths, bands or channels to provide a dynamic gain equalization filter signal, such as a pixelated optical filter, a Mach Zender/Fourier interference filter, acoustic filter, array waveguide or variable optical attenuator.

The channel monitor provides a signal that is indicative of a profile of the power levels of the various wavelengths, channels or bands of the optical signals, and may include a micromirror device, an optical channel monitor (OCM), an optical channel analyzer (OCA), or optical power meter capable of accurately monitoring power levels. The channel monitor may include either a band attenuation mode or a channel-by-channel mode, and may be constructed independent of any particular channel plan.

The processor may include software and hardware capable of dynamically controlling the equalization filter to equalize the power spectrum of wavelengths, channels or bands entering the equalization filter. In operation, upon receiving information from the channel monitor, the processor provides commands to the equalization filter to selectively attenuate preselected wavelengths, channels or bands to provide a preselected spectrum output. The processor may also operate to either attenuate each of the optical signals by substantially the same amount, controllably attenuate the optical signals so that the output amplifier is provided with a preselected gain profile for each of the optical signals, correct the gain tilt of the output amplifier, or a combination thereof.

The coupler may include an optical tap or splitter.

The output amplifier provides a second stage of amplification. The input amplifier, output amplifier or a combination thereof may include an erbium doped fiber amplifier.

The smart node may also include a reconfigurable optical add/drop multiplexer for adding and dropping one or more of the optical signals to and from the smart node. In operation, the processor, either through programmed software, firmware, or by other means, may command the reconfigurable optical add/drop multiplexer to add certain channels and/or drop other certain channels. In one embodiment, the reconfigurable optical add/drop multiplexer is arranged between the input amplifier and the equalization filter. In alternative embodiments, the reconfigurable optical add/drop multiplexer may be arranged either after the coupler, or before the input amplifier.

The smart node may also include a dispersion sensor and a dispersion compensator that combine to provide the ability to dynamically compensate for dispersion within the various bands or channels, as well as a second coupler arranged after the coupler connected to the output amplifier. The dispersion sensor is arranged between the second coupler and the processor, receives a small portion of the filter optical signals from the coupler, and determines the dispersion among the various channels or bands. The dispersion compensator may be arranged between the reconfigurable optical add/drop multiplexer and the equalization filter and compensates for the dispersion of the various channels. The dispersion sensor and the dispersion compensator are controlled by the processor. The dispersion sensor may include a bit error rate detector, an open eye diagram or other devices suitable for detecting chromatic dispersion, polarization mode dispersion or dispersion slope. The dispersion compensation device may include a chromatic dispersion compensator (CDC), a polarization mode dispersion compensator (PMDC) or a dispersion slope compensator. In an alternative embodiment, the dispersion compensator may be arranged between the equalization filter and the output amplifier to compensate for the dispersion of the various channels.

The smart node may also include a wavelength conversion device optically coupled to the reconfigurable optical add/drop multiplexer, which provides for the ability to dynamically add a channel regardless of its wavelength. The wavelength conversion device comprises a tunable laser by controlled the processor.

BRIEF DESCRIPTION OF THE DRAWING

The drawing, not drawn to scale, includes the following Figures:

FIG. 5 is a graphical representation of one aspect of the reconfigurability of the embodiment of FIG. 4.

FIG. 6 is a schematic diagram of a smart node including a DGEF, OCM and ROADM in accordance with the present invention.

In the drawing, similar elements in FIGS. 2–4 and 6–11 are labelled with similar reference numerals throughout the patent application.

DETAILED DESCRIPTION OF THE INVENTION

Figure 1:
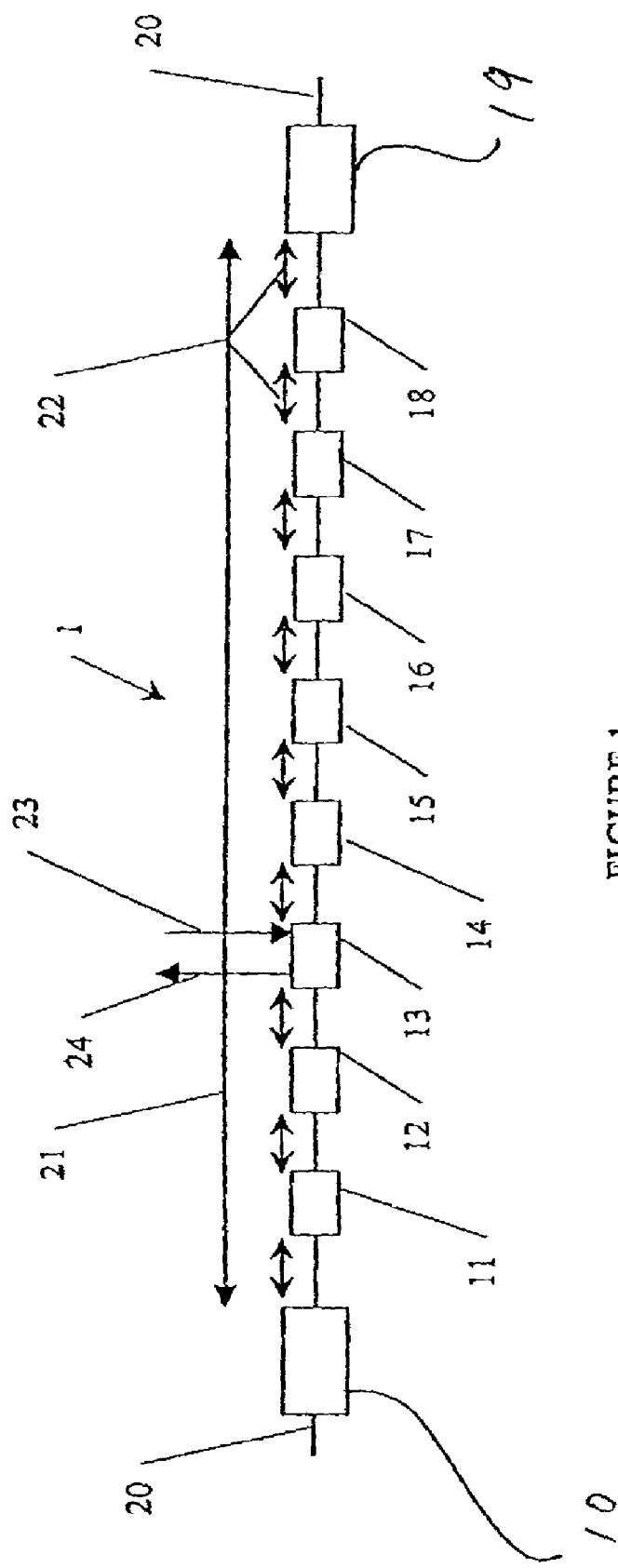
FIG. 1 is a schematic diagram of a link of a fiber optic communications network having a smart node that is the subject matter of the present invention.

FIG. 1: The Smart Link

FIG. 1 shows an optical communications network in the form of a smart link generally indicated as 1. The smart link comprises an express line 20 and at least one pair of terminals 10, 19 having a plurality of smart nodes 11–18 positioned therebetween. The link 1 may be part of a larger link or optical network (not shown). The terminals 10, 19 may operate for both transmission and receiving of optical signals along the express line 20 which may comprise one or more fiber optic transmission cables. The terminals 10, 19 provide a number of optical signals, or channels, each at a distinct wavelength as is known in the industry. The terminals may be separated by a relatively large physical distance 21 necessitating amplification at the smart nodes 11–18. As shown, the smart nodes 11–18 are separated by a shorter physical distance 22 than the terminals 10, 19, typically between 50 and 100 kilometers (about 30 and 60 miles). In addition to various optical signals carried along the express line 20, between terminals 10 and 19 optical signals on optical lines 23, 24 may be added and/or dropped from the network at any of the smart nodes 11–18.

As is known, losses occur during the transmission of optical signals along lengths of fiber 20 that result in various network problems. To overcome the losses, optical amplifiers (see FIG. 2) are positioned in the various nodes along the network. It is in combination with these optical amplifiers that certain configurations of smart nodes, or dynamic nodes, 11–18 of the present invention are embodied. Although shown by way of illustration as part of the link 1 in FIG. 1, a smart node of the present invention is not limited thereto and may simply be a stand-alone device as described herein below.

Moreover, the smart nodes 11–18 in accordance with the present invention includes dynamic optical signal manipulation devices in combination with sensing devices and processors to provide real time closed and open loop control of various channels of network. These devices, as will be described more fully herein below, include singularly, or in combination, a dynamic gain equalization filter (DGEF), a dynamic reconfigurable optical add/drop multiplexer (ROADM), an optical cross connect (OXC), an optical channel monitor (OCM), an optical channel analyzer (OCA), a band selector, a wavelength converter (including a tunable laser and a modulator), a chromatic dispersion compensator, a polarization mode dispersion compensator, a scanning Fourier transform interferometer, a dynamic variable multiplexer (V-Mux), a dynamic variable attenuator (VOA) and a tunable bandpass filter (TBF).

Figure 2:
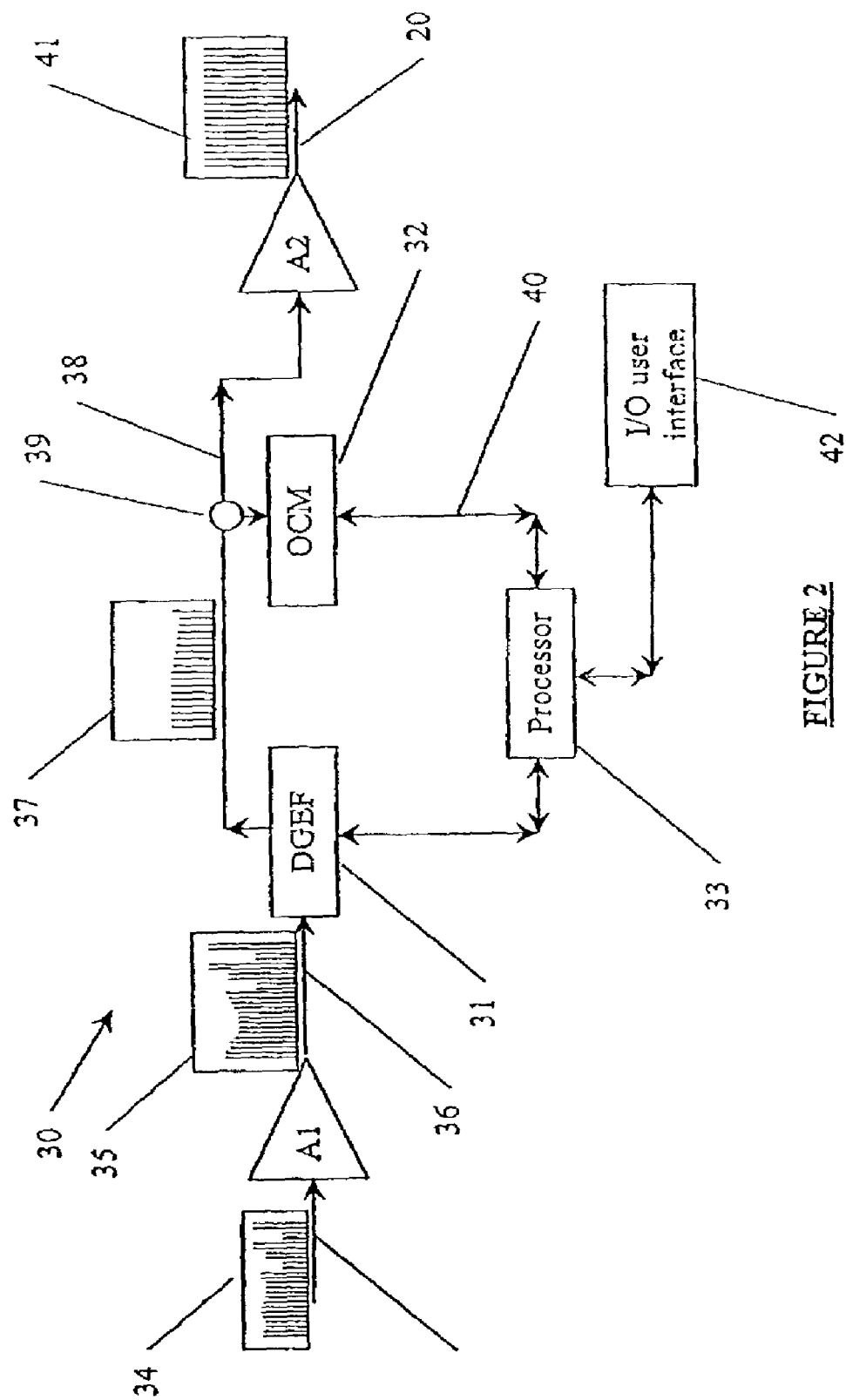
FIG. 2 is a schematic diagram of one embodiment of a smart node according to the present invention.

FIG. 2: Dynamically Reconfigurable Optical Smart Node

FIG. 2 shows in detail the smart nodes 11–18 shown in FIG. 1. The smart node in FIG. 2 is generally indicated as 30. The smart node 30 has a pair of optical input and output amplifiers A1, A2, a DGEF 31 and an OCM 32 arranged in conjunction with a processor 33, a tap or coupler 39, and an input/output interface 42. In the smart node 30, the DGEF 31, the OCM 32 and the processor 33 combine to provide a continuous, real time, autonomous feedback and correction in the form of a dynamic closed-loop control in accordance with the present invention, consistent with that described below.

The basic operation of the smart node 30 works as follows:

The input amplifier A1 receives a plurality of optical signals, each at a respective one of wavelengths $\lambda_1-\lambda_n$ typically within a range of 1500 to 1610 nm, or inclusive of channels or bands, such as the C band, L band, as well as the S band. The plurality of optical signals, which may include wave division multiplexed (WDM) signals, enter the smart node 30 via the express line 20 (see also FIG. 1) and have various levels of power as depicted by an input power spectrum 34. The input power spectrum 34 is intended to be illustrative of a typical spectrum of individual channels $\lambda_1-\lambda_n$ depicted by the plurality of vertical lines representing various power levels. The input amplifier A1 provides a power gain, typically on an order of 10–35 decibels (Db), to the channels and further typically introduces some gain tilt to the channels. The anomalous gain amplification profile or otherwise uneven amplification, referred to herein as gain tilt to the channels, is depicted by a power spectrum 35.

The amplified channels are provided to the DGEF 31 via the express line 36 wherein preselected wavelengths, channels or bands are selectively attenuated to provide a dynamic gain equalization filtered signal of a preselected attenuated spectrum as depicted in a preselected spectrum output 37. The DGEF 31 functions to trim or equalize the individual wavelengths, channels or bands of optical signals, and may comprise any known or contemplated device capable of performing these functions, such as a Mach Zender/Fourier interference filter, acoustic filter, array waveguide or variable optical attenuator. One embodiment of the DGEF 31 is discussed in further detail below.

The amplified and selectively attenuated wavelengths, channels or bands are provided to the output amplifier A2 via the coupler 39 and a transmission line 38, and a portion of the filtered signal is directed to the OCM 32 via the coupler 39.

The OCM 32 provides an optical channel monitor signal, typically an electrical signal, to the processor 33 via line 40 that is indicative of the profile of the power levels of the various wavelengths, channels or bands of the spectrum. The OCM 32 may comprise any OCM, OCA, or optical power meter capable of accurately monitoring the power levels of the spectrum. One embodiment of the OCM 32 is discussed in further detail below.

The processor 33 includes software and hardware capable of dynamically controlling the DGEF 31 to equalize the power spectrum of the wavelengths, channels or bands entering the DGEF 31 via line 36. The processor 33 upon receiving the information from the OCM 32 provides commands to the DGEF 31 to selectively attenuate preselected wavelengths, channels or bands to provide the preselected spectrum output 37. The processor 33 variably controls the DGEF 31 with a control signal and attenuates each of the optical signals by substantially the same amount and controllably attenuates the optical signals so that the output amplifier A2 is provided with a preselected gain profile for each of the optical signals.

In addition to dynamically correcting for the gain tilt of the input amplifier A1, the processor 33 also has information relating to the anticipated profile of the gain tilt from the amplifier A2. The gain tilt of the amplifier A2 is corrected by the smart node 30 by commanding the processor 33 to attenuate the spectrum to present an optical signal profile having an inverse of the gain tilt of the amplifier A2. The result of this correction is shown in the power spectrum 37. The signal emerging from the smart node 30 via the express line 20 would be of increased power and substantially equalized as shown in an output power spectrum 41.

The optical signals are supplied from the DGEF 31 via the transmission line 38 to the amplifier A2 containing a second segment of active optical fiber, which provides a second stage of amplification. The active optical fiber of the output amplifier A2 is typically pumped with light from a laser (not shown) at a wavelength, e.g., 1480 nm, which is different than the optical signal wavelengths $\lambda_1$–$\lambda_n$. In addition, the second segment of active optical fiber is pumped in such a manner and has an appropriate composition that yields a high power output to the express line 20. Although the various power of the input and output amplifiers A1, A2 are given by way of example it is important to note that the combination of the amplifiers and various components of the smart node 30 must yield a signal having sufficient power for the transmission and use contemplated.

The output amplifier A2 provides a power gain, typically on the order of 10–35 Db, to the channels and, similar to the input amplifier A1, typically introduces some gain tilt or otherwise uneven amplification to the channels. The power of optical signals provided to the output amplifier A2 is typically significantly more than the power of optical signals supplied to the OCM 32. For example, the power at output supplied to the OCM 32 can be approximately 2% of the power depicted in the power spectrum 37, while the power supplied to the output amplifier A2 can be approximately 98% of the power depicted in power spectrum 37 (neglecting coupler loss, for simplicity).

The pair of optical input and output amplifiers A1, A2 may comprise an erbium doped fiber amplifier (EDFA) or other known amplifier. In an EDFA, the fiber is typically doped with the fluorescent material, erbium, and pumped with light at a wavelength different than the amplified optical signals, for example, 980–1480 nanometers (nm). A pump laser (not shown) is typically coupled to the active optical fiber of amplifiers in a known manner to excite the fluorescent material. The pump light is of sufficient magnitude and the composition of active optical fiber is such that the optical signals output from A1 (and A2 similarly) are amplified with high gain, but with relatively little noise.

In particular, the DGEF 31 may comprise a pixilated optical filter as disclosed in copending, commonly assigned, U.S. Patent Application Ser. No. 60/281,079, entitled "Reconfigurable Pixelated Optical Filter," filed Apr. 3, 2001, as well as U.S. Patent Application Ser. No. 60/311,002, filed Aug. 8, 2001, entitled "Dynamic Optical Filter having an Array of Micro-Mirrors," filed Aug. 8, 2001; Ser. No. 10/115,647, entitled "Dynamic Optical Filter Having a Spatial Light Modulator", filed Apr. 3, 2002; Ser. No. 10/159,370, entitled "Optical Channel Monitor", filed May 31, 2002; Ser. No. 60/332,318, entitled "Chromatic dispersion compensation device having an array of micromirrors", filed Nov. 16, 2001; Ser. No. 60/325,065, entitled "Reconfigurable Optical Add/Drop Multiplexer having an Array of micromirrors", filed Sep. 25, 2001; Ser. No. 60/325,068, entitled "Optical Cross-connect having an array of micromirrors", filed Sep. 21, 2001; Ser. No. 60/325,066, entitled "Optical Channel monitor having an Array of Micromirros", filed Sep. 25, 2001; Ser. No. 60/325,064, entitled "Optical Interleaver/deinterleaver device having an array of micromirrors", filed Sep. 25, 2001; Ser. No. 60/344,585, entitled "Optical blocking filter having an array of micromirrors", filed Dec. 28, 2001; Ser. No. 60/352,297, entitled "Multifunctional optical device having spatial light modulator", filed Jan. 28, 2002; Ser. No. 10/115,648, entitled "Variable Optical Source", filed Apr. 3, 2002; Ser. No. 10/120,617, entitled "Adaptive filter/attenuator using pixilated reflector", filed Apr. 11, 2002, the disclosures all of which are hereby incorporated by reference in their entireties. In operation, the OCM 32 would provide a signal to the processor 33 that a certain channel centered at wavelength $\lambda_2$ needs to be attenuated. In order to attenuate the optical channel centered at wavelength $\lambda_2$, the processor 33 commands a predetermined number of micro-mirrors disposed in the area illuminated by the optical channel at $\lambda_2$ to tilt to reflect a portion of the light of the optical channel away from the return path. In this manner, the OCM 32 provides signals indicative of the power profile of the entire spectrum, including the anticipated gain tilt of the output amplifier A2, and the processor 33 in turn commands the DGEF 31 to selectively attenuate the channels or bands having power levels above a predetermined threshold in order to provide the preselected channel profile depicted in the spectrum 37.

In addition, the OCM 32 may comprise a micro-mirror device as set forth in the copending U.S. patent applications referenced above. In such a micro-mirror based OCM 32, the micro-mirrors may be tilted such that all but one optical channel is dropped, and therefore, a single optical channel is reflected back through the optics making the device useful as either an OCM or an optical power monitor (OPM). The output optical signal may be provided to a photodetector or charge coupled device (CCD) array to determine certain characteristics of the optical channel(s), such as power, wavelength, signal-to-noise ratio, etc. In such a configuration, a controller (not shown) of the OCM 32 sequentially tilts each group of the micro-mirrors illuminated by each optical channel to sequentially return each optical channel back to the optics, to effectively scan across the spectral range to analyze each optical channel. The OCM 32 based on the micro-mirror device is capable of switching between a first and second position in approximately 16 microseconds.

The coupler 39 may be a conventional optical tap or splitter, which supplies each of the plurality of optical signals to both the OCM 32 and the output amplifier A2.

In addition, the smart node 30 may include an input/output (I/O) user interface 42 to remotely link the smart node 30 to the outside world. The I/O interface 42 enhances the usefulness of smart node 30 by, for instance, allowing for external motoring of the network's health and correction thereto via remote manipulation of the node, and the network thereby, by a network manager.

Figure 3:
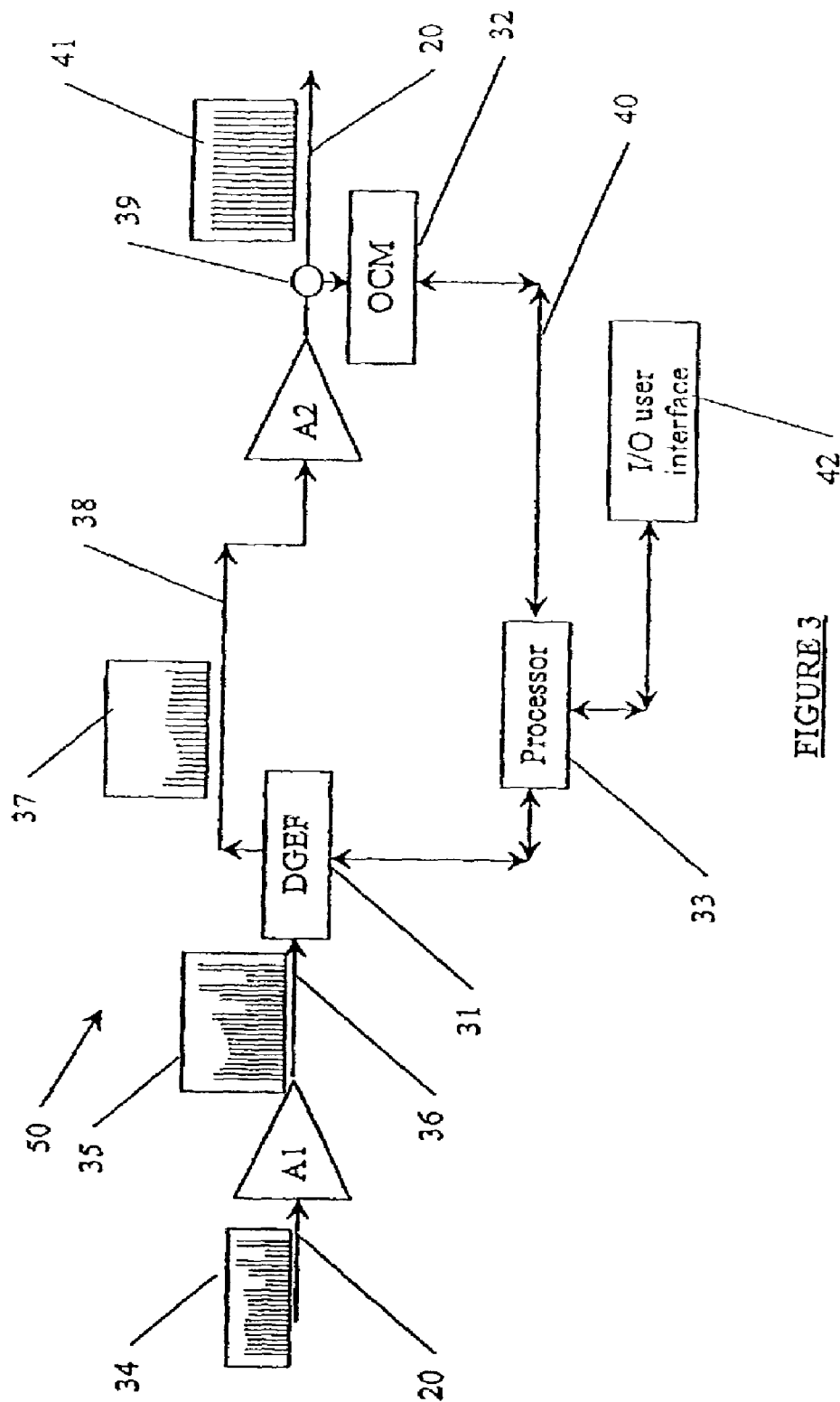
FIG. 3 is an alternative embodiment of the smart node of FIG. 2 according to the present invention.

FIG. 3: The Smart Node 50

FIG. 3 shows an alternative embodiment of a smart node generally indicated as 50, in which the amplifier A2 is arranged after the coupler 39.

In operation, the OCM 32 is positioned after both the input and output amplifiers A1 and A2 and therefore the gains and gain tilt, among other signal inequities, of the A1, A2 amplifiers are determined, and adjusted by varying the attenuation the various optical channels via the DGEF 31 so that output spectrum 41 corresponds to a uniform spectral gain. As shown, the coupler 39 taps a portion of the power of the optical signals from transmission line 20 to supply the OCM 32. Consistent with that discussed above, the OCM 32 provides an output signal indicative of the power levels of the various wavelengths, channels or bands of the spectrum. The processor 33 analyzes the output of the OCM 32 and through proper algorithms outputs a control command to the DGEF 31 to attenuate certain of the signals to output the predetermined spectrum 37. In the embodiment shown, the gain tilt of the output amplifier A2 is dynamically controlled wherein the DGEF 31 responds to the output from the OCM 32 and provides the output spectrum 37 having an inverse of the gain tilt of the output A2. In this embodiment, the smart node 50 dynamically compensates for any drift in the input and output amplifiers A1, A2, loss in the various components or fibers or other power fluctuations, and provides the output spectrum 41 having a substantially uniform gain.

Figure 4:
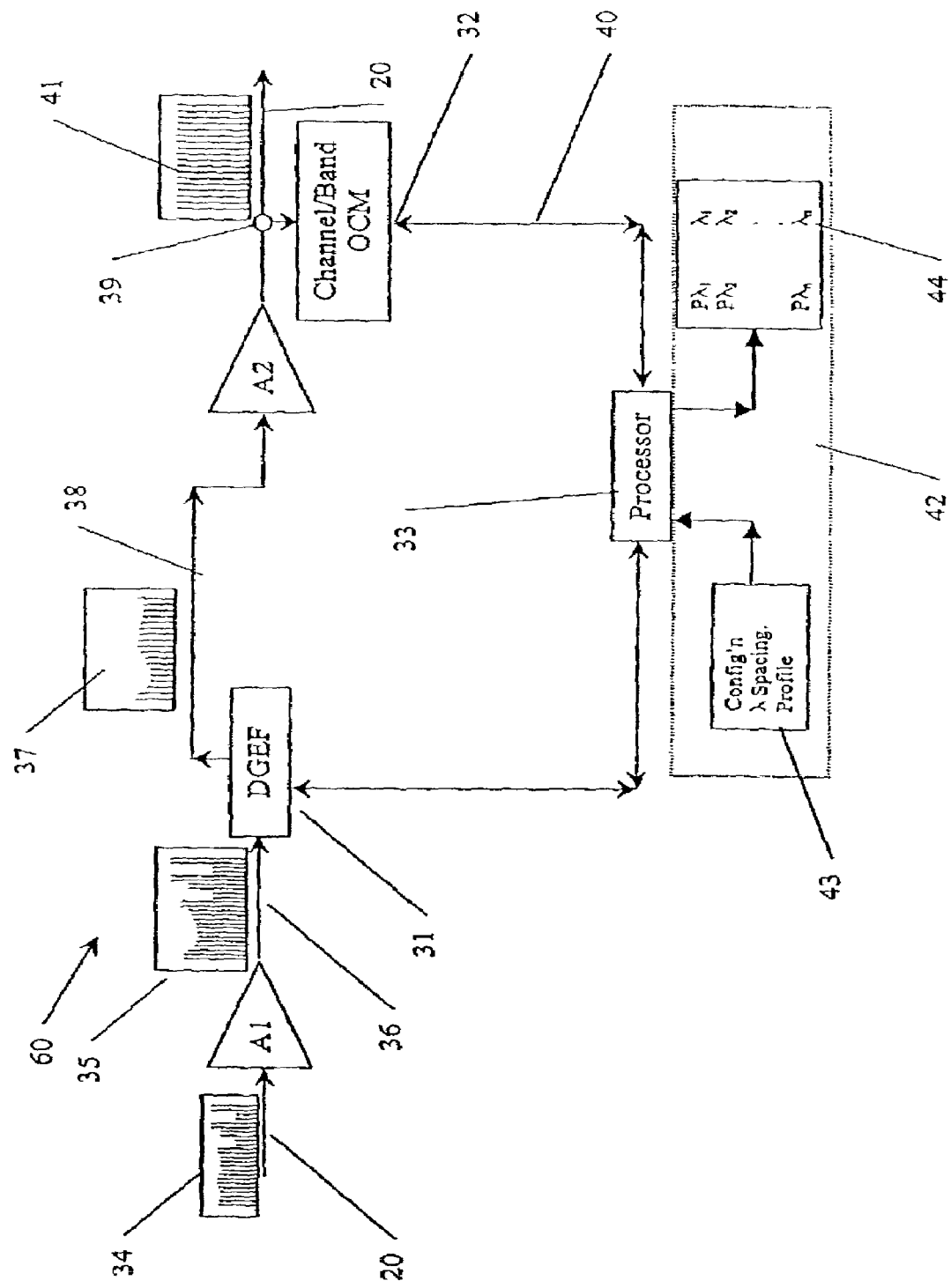
FIG. 4 is an alternative embodiment of the smart node of FIG. 3 in accordance with the present invention including dynamic reconfigurability.

FIG. 4: The Smart Node 60

FIG. 4 shows a smart node generally indicated as 60, in which the OCM 32 has band and channel-by-channel attenuation modes and the I/O user interface 42 has user input/output functionality. The smart node 60 takes particular advantage of the dynamic agility of the underlying design by allowing for operation not only in a band attenuation mode or channel-by-channel manipulation/attenuation mode as described herein above, but also by accommodating the varying spacing between bands or channels.

For example, the DGEF 31 and the OCM 32 may be controlled through an input user interface 43 of the I/O user interface 42 to the processor 33, or other processor means (not shown), to operate in the channel-by-channel manipulation mode so that the output from the smart node 60 would yield an equalized spectrum 41 across all channels. The OCM 32 monitors at least the power level of each band and provides an output monitoring signal indicative thereof to the processor 33 via the line 40. The processor 33 through suitable algorithms commands the DGEF 31 to attenuate certain channels to provide the output spectrum 37 which is typically the inverse of the gain tilt of the product of A1 and A2 (i.e. A1×A2).

In addition, the format of the channel count and/or spacing of the DGEF 31 and the OCM 32 could be controlled through the input user interface 43 to the processor 33 so that the channel spacing differs across the spectrum. The channel plan independence may be accomplished using a micro-mirror based DGEF and OCM as described herein above wherein the various channel spacings are accommodated by utilizing different numbers and positions of micro-mirrors. In one such embodiment, the DGEF 31 and the OCM 32 may share a common digital micro-mirror device (DMD). In such a smart node 60, the performance is spectrally independent of the underlying channel plan.

The present invention is described in a specific example with reference to FIG. 5 wherein two distinct channel spacings are accommodated. In this particular example, channels centered about wavelengths $\lambda_1-\lambda_5$ are each positioned on approximately 1000 mirrors at a channel spacing of 50 Ghz and channels centered at wavelengths $\lambda_6-\lambda_n$ are positioned on approximately 500 mirrors at a channel spacing of 25 Ghz. In this configuration, the OCM 32 monitors at least the power level and channel wavelength position of channel and provides an output signal indicative thereof to the processor 33 via the line 40.

The processor 33 through suitable algorithms commands the DGEF 31 to attenuate certain of the channels to provide an output spectrum 37 which is typically the inverse of the gain tilt of the product of input and output amplifiers A1 and A2 (A1×A2). The resultant output of the smart node 60 would yield a substantially equalized gain of all channels $\lambda_1-\lambda_n$ at the various predetermined channel spacing.

Further, the DGEF 31 and the OCM 32 (and smart node 60 thereby) could be controlled through the processor 33 to operate in the band-by-band manipulation mode so that the output from smart node 60 would yield an equalized gain spectrum 41 across all bands. In this case, the OCM 32 monitors at least the power level of each band and provides an output signal indicative thereof to the processor 33 via the line 40. The processor 33 through suitable algorithms commands the DGEF 31 to attenuate certain bands to provide the output spectrum 37 which is typically the inverse of the gain tilt of the product of amplifiers A1 and A2 (A1×A2) on a band by band basis.

The profile of the output spectrum 41 of the smart node 60 may also be advantageously reconfigured through the input user interface 43. For example, if certain channels or bands need not be attenuated for certain predetermined reasons those particular channels or bands could be selectively treated through discrete commands by the processor 33. In particular, if it were determined that a particular channel at $\lambda_j$ required maximum gain as transmitted from the smart node 60, then an input through the input user interface 43 could allow for minimal or diminished attenuation of channel $\lambda_j$. The output spectrum 41 in this particular instance would not be substantially equalized but will be of a predetermined profile to match the requirements of the input to the smart node 60 via the input user interface 43. Other various predetermined output spectra 41 are contemplated by the present invention such as if the link includes the S band and there is gain tilt from a Raman amplifier or other S-band amplifier.

In the above examples, the input user interface 43 is described as receiving discrete input from an outside user. However, the input user interface 42 is illustrative of an input into the smart node 60 and may take on various forms such as a separate processor input or one that is integral to the smart node 60. For instance, an input to the smart node 60 may take place on a timing, traffic or other distinct attribute basis to dynamically change the configuration as contemplated by the various embodiments of the present invention.

The smart node 60 (as well as any other contemplated embodiment) may also include an output user interface 44 in addition to the input user interface 43. The output user interface 44 may advantageously allow an operator or system to monitor the operation and or health of the smart node 60, link 1 (FIG. 1) or the network (not shown). For instance, the output user interface 44 may output the power levels of the various bands or channels, the band or channel spacing, channel drift, the degree of attenuation taking place, and along with other sensors or devices (as discussed herein) the amount of dispersion/correction, or empty channels, etc.

Such output may also be useful for downstream manipulation of the signals by other various smart nodes or links. For instance, if it were reported to the smart node 11 of FIG. 1 that a channel was missing at $\lambda_2$ then a channel could be added at that particular wavelength at the smart node 13 comprising an ROADM via line 23 as will be described more fully below. Alternatively, if the channel were found to be missing due to a network error at node 11, a diagnostic routine could be run at the network level to determine the cause for the missing channel. In addition, the OCM 32 of the smart node 11 could determine that a particular channel was missing and report that error to the network via the input user interface 43.

The scope of the invention is intended to include other configurations in addition to those discussed above in relation to FIG. 4. The above configuration can also be utilized as a tunable filter and can be configured to fulfill various applications. In its most fundamental form the smart node 60 may comprise an arbitrary filter function formed by actuating components of a micro-mirror device corresponding to the spectral filter function desired. The light from these mirrors is collected and directed to an output fiber where it can be acted upon by a variety of devices. Due to the very fast actuation times associated with MEMS micro-mirror devices, this operation can be performed on time scales faster than milliseconds. In addition, the micro-mirrors can be actuated in a sequential fashion to permit scanning of the input optical spectrum across the output fiber. A detector located at this position could serve to detect the optical power and provide an OCM or OSA functionality. Various algorithms could be employed to calculate values for wavelength, power and OSNR from the detected power. One very powerful feature of this system is its ability to vary the filter function. A variable bandwidth (VBW) filter function could be obtained that could change depending on the requirements of the system or network. Along these lines a single device could be configured to operate on 100 Ghz or 50 Ghz spaced channels. In addition, if the variable bandwidth feature is utilized, a system that is mixed with various channel spacing could be interrogated. An additional example of the potential use of the variable bandwidth feature is a combined OSA and drop unit. In this system a wide BW filter would be used to drop a channel to minimize the degradation of the channel. In the OCA mode a narrow filter function would be employed to provide accurate powers, wavelength and optical signal-to-noise ratio (OSNR).

FIG. 6: The Smart Node 70

FIG. 6 shows an embodiment of a smart node generally indicated as 70 that includes an ROADM 71 arranged between the amplifier A1 and the DGEF 31 and controlled by the processor 33. ROADM's are generally known in the industry and serve to allow the dynamic addition and removal of a preselected channel(s) from the express line 20. In addition to the ability of the smart node 70 to provide all of the spectra manipulation discussed herein, the smart node 70 further allows the dynamic reconfigurability of the ROADM 71 and the subsequent equalization and other manipulation of the added channel(s).

In operation, the OCM 32 senses channel presence, wavelengths and power levels and sends a signal indicative of such information to the processor 33 via line 40. The processor 33 then either through programmed software, firmware, or by other means, commands the ROADM 71 to add certain channels via an optical line 23 and/or drop other certain channels via an optical line 24. In addition, the I/O user interface 42 may be used to provide the output from the processor 33 regarding channel count, spacing, presence and further provide the smart node 70 with the ability to reconfigure the channels as described herein above.

In another aspect of the present invention, the processor 33 may further command the ROADM 71 via line 72 to add and/or drop certain channels based on the output from the I/O user interface 42 or from an input from a user or other smart node 11–18, link 1 (FIG. 1), or network (not shown).

As discussed, the smart node of the embodiment allows for the manipulation and trimming/equalization of channels or bands added via the optical line 23 but does not provide any signal conditioning to the dropped channels exiting the smart node 70 via the optical line 24. In addition, the channels added via the optical line 23 do not benefit from the first stage of amplification provided by the amplifier A1.

In this particular embodiment, the smart node 70 may also include the ability to reconfigure the operation of the DGEF 31 to ignore the possibility that the added channel(s) may be weaker than others. In so doing, for example, the DGEF 31 may work to equalize all other channels except the added channel(s) and provide an output spectrum 41 that is somewhat higher in overall gain than would otherwise be possible if the added channel(s) were considered.

In embodiments of the present invention that utilize DMD technology, a single DMD chip can be multiplexed to perform multiple manipulation functions at the same time or on the same "real estate". For instance, in one particular embodiment of a DGEF approximately 20% of the DMD chip may be utilized, leaving about 80% of the chip for other functions.

Figure 7:
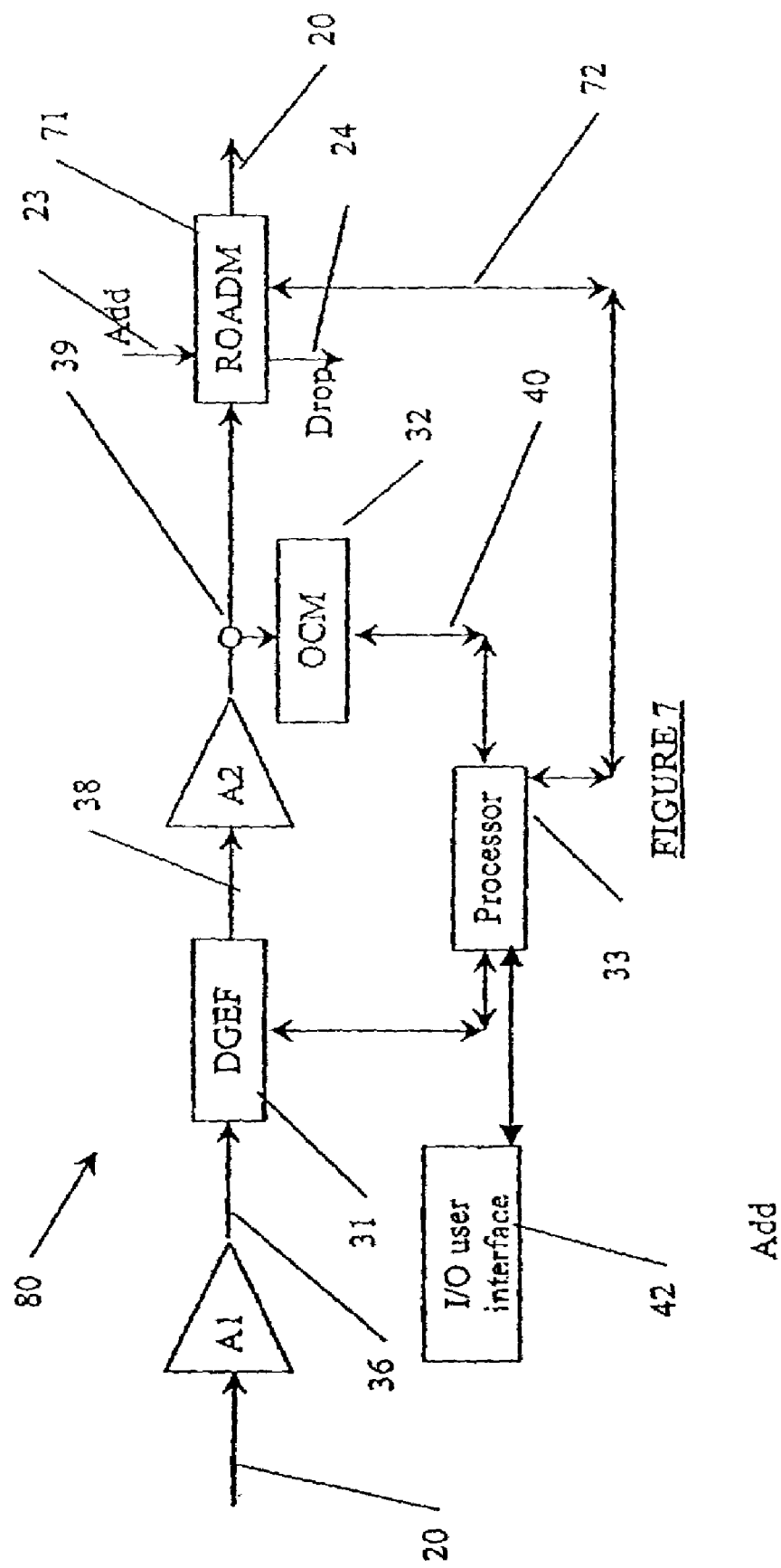
FIG. 7 is an alternative embodiment of the smart node of FIG. 6 in accordance with the present invention.

FIG. 7: The Smart Node 80

FIG. 7 shows a smart node generally indicated as 80, in which the ROADM 71 is arranged after the amplifier A2 and the coupler 39 and controlled by the processor 33. The smart node 80 is an alternative embodiment to that shown in FIG. 6, in which the ROADM 71 is arranged after the amplifier A1. In the smart node 80, all the functionality similar to the smart nodes 60 (FIG. 4) and the smart node 70 (FIG. 6) is preserved except for the ability to equalize the channels added via line 23. In FIG. 7, the added channel(s) do combine with the output spectrum and exit the node via the express line 20.

Figure 8:
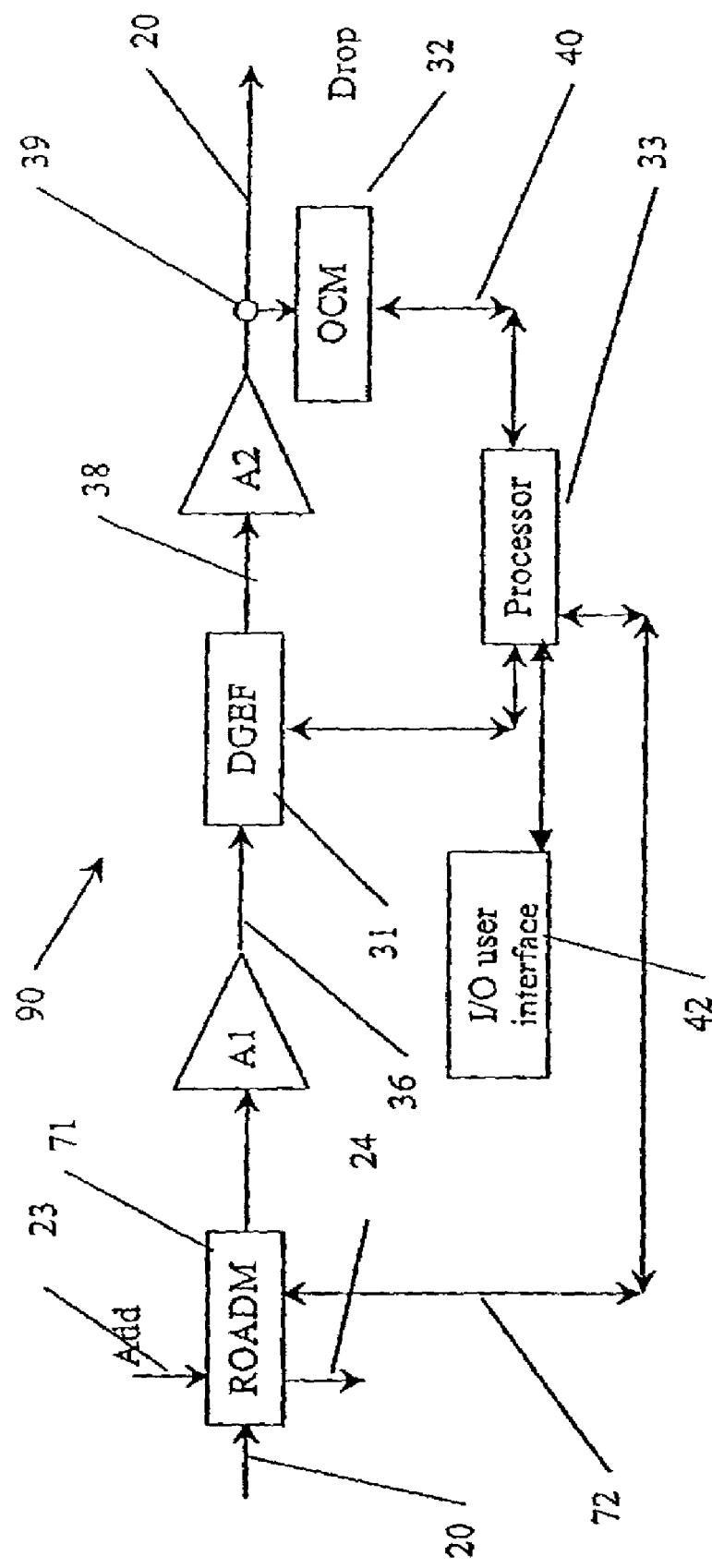
FIG. 8 is an alternative embodiment of the smart node of FIG. 6 in accordance with the present invention.

FIG. 8: The Smart Node 90

FIG. 8 shows a smart node generally indicated as 90, in which the ROADM 71 is arranged prior to the first stage of amplification A1 and controlled by the processor 33. In this particular embodiment, all of the functionality in terms of signal manipulation and configuration control and of smart nodes 60 (FIG. 4), 70 (FIG. 6) with the additional enhancement of introducing added channel(s) via the optical line 23 prior to the first stage of amplification A1. In this particular embodiment the DGEF 31, the OCM 32 and the processor 33 cooperate to provide an output spectrum 41 having a maximum overall gain for all channels including those optical signals added via the optical line 23.

FIG. 9

Figure 9:
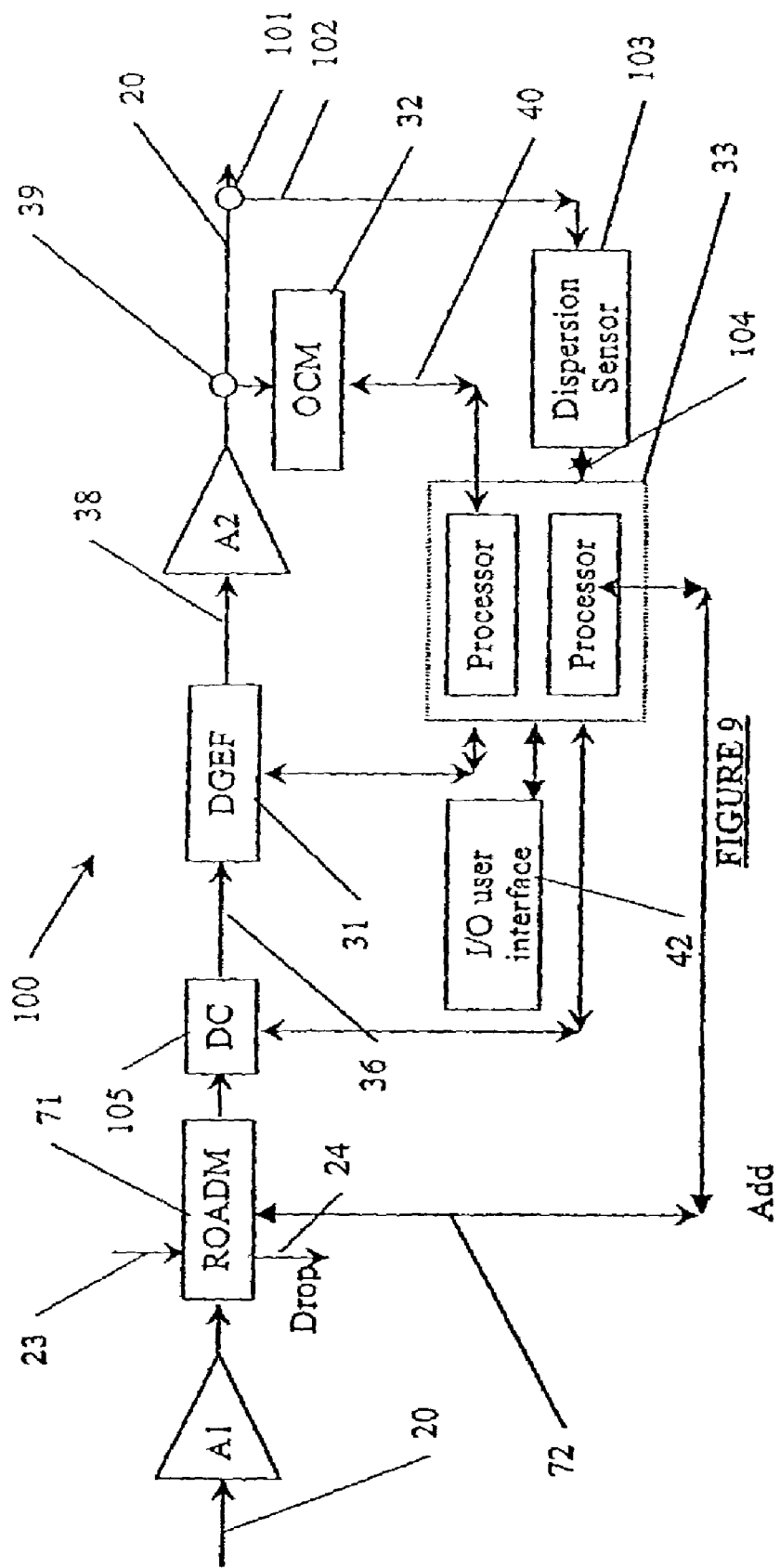
FIG. 9 is a schematic diagram of the smart node including a DGEF, OCM, ROADM, dispersion sensor and dispersion compensator in accordance with the present invention.

FIG. 9 shows a smart node generally indicated as 100 that includes a dispersion sensor 103 and a dispersion compensator 105. The dispersion sensor 103 is arranged between a coupler 101 and the processor 33 after the amplifier A1. The dispersion compensator 105 is arranged between the ROADM 71 and the DGEF 31 and controlled by the processor 33. As is known, most of the various components along a link or fiber in a link contribute in some way to dispersion. The dispersion sensor 103 and the dispersion compensator 105 combine to provide the ability to dynamically compensate for dispersion within the various bands or channels.

In operation, the smart node 100 includes the optical coupler 101, similar to optical coupler 39 described herein above, to direct a small portion of the output spectrum 41 via the line 102 to the dispersion sensor 103. The dispersion sensor 103 determines the dispersion among the various channels or bands and provides an output signal indicative of such dispersion to the processor 33 via a line 104. The processor 33 then either through programmed software, firmware, or by other means, commands the dispersion compensator 105 to compensate the dispersion of the various channels, including those channel(s) added by the ROADM 71. The smart node 100 is dynamically reconfigurable to provide a predetermined output spectrum 41 to the express line 20 that manipulates the signals as described for the various embodiments above with the additional ability to dynamically compensate for various dispersion effects. As a person skilled in the art would appreciate, the ROADM 71 may also be arranged prior to the amplifier Al as described herein above without departing from the scope of the present invention.

The dispersion sensor 103 may comprise a bit error rate detector, an open eye diagram or other known or contemplated devices that are capable of detecting chromatic dispersion (or the absence thereof), polarization mode dispersion or dispersion slope accurately enough to enable the present invention.

The dispersion compensation device 105 may comprise a chromatic dispersion compensator (CDC), a polarization mode dispersion compensator (PMDC) or a dispersion slope compensator.

FIG. 10

Figure 10:
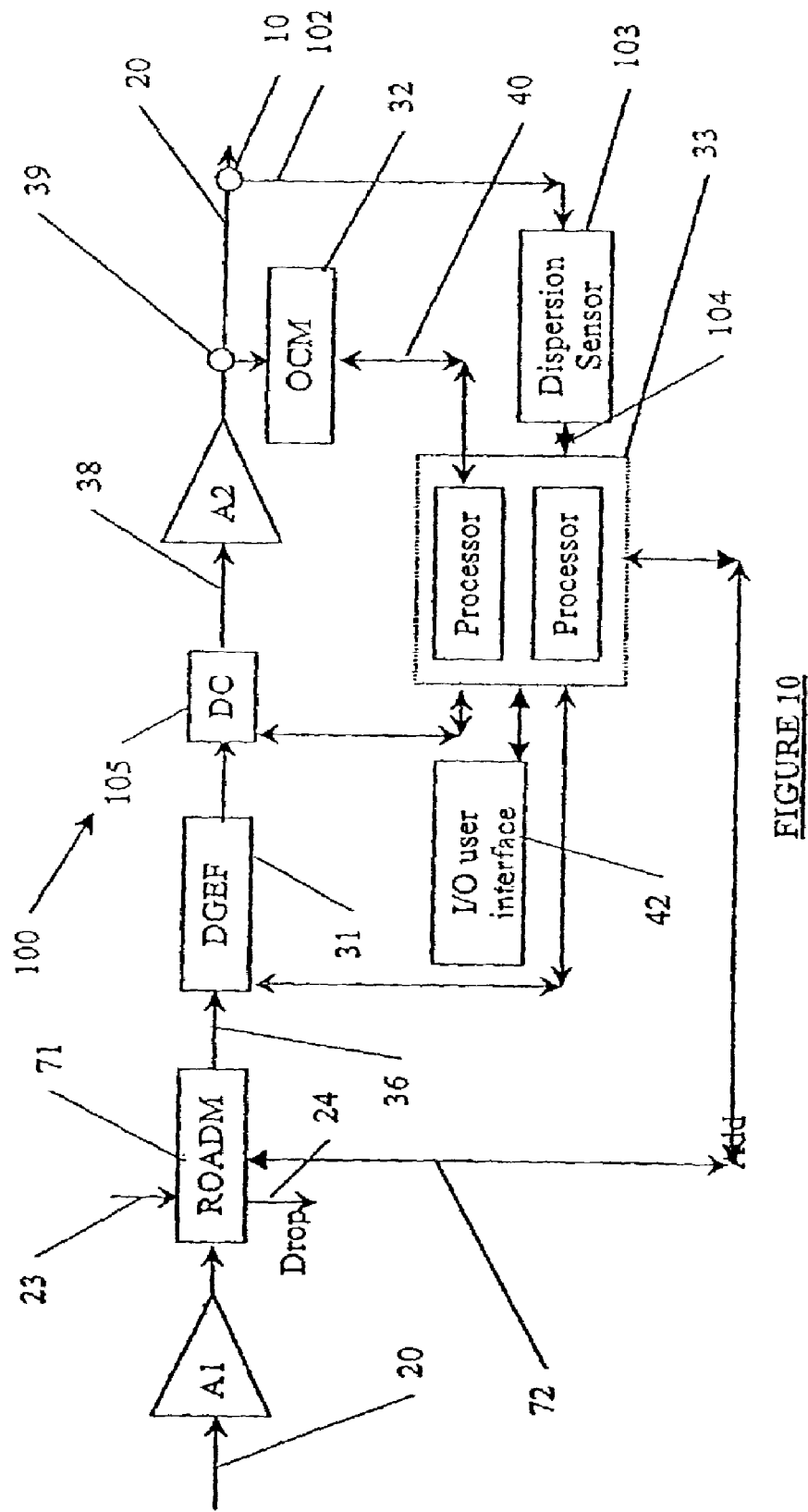
FIG. 10 is an alternative embodiment of the smart node of FIG. 9 in accordance with the present invention.

FIG. 10 shows a smart node generally indicated as 110 which is an alternative embodiment of the present invention. In this embodiment, the dispersion compensator 105 is arranged between the DGEF 31 and the amplifier A2. In this particular embodiment, all the functionality of the smart node 100 of FIG. 9 is preserved. In addition, the dispersion compensator 105 in combination with dispersion sensor 103 accommodates any dispersion caused by the various components within the smart node 110.

FIG. 11

Figure 11:
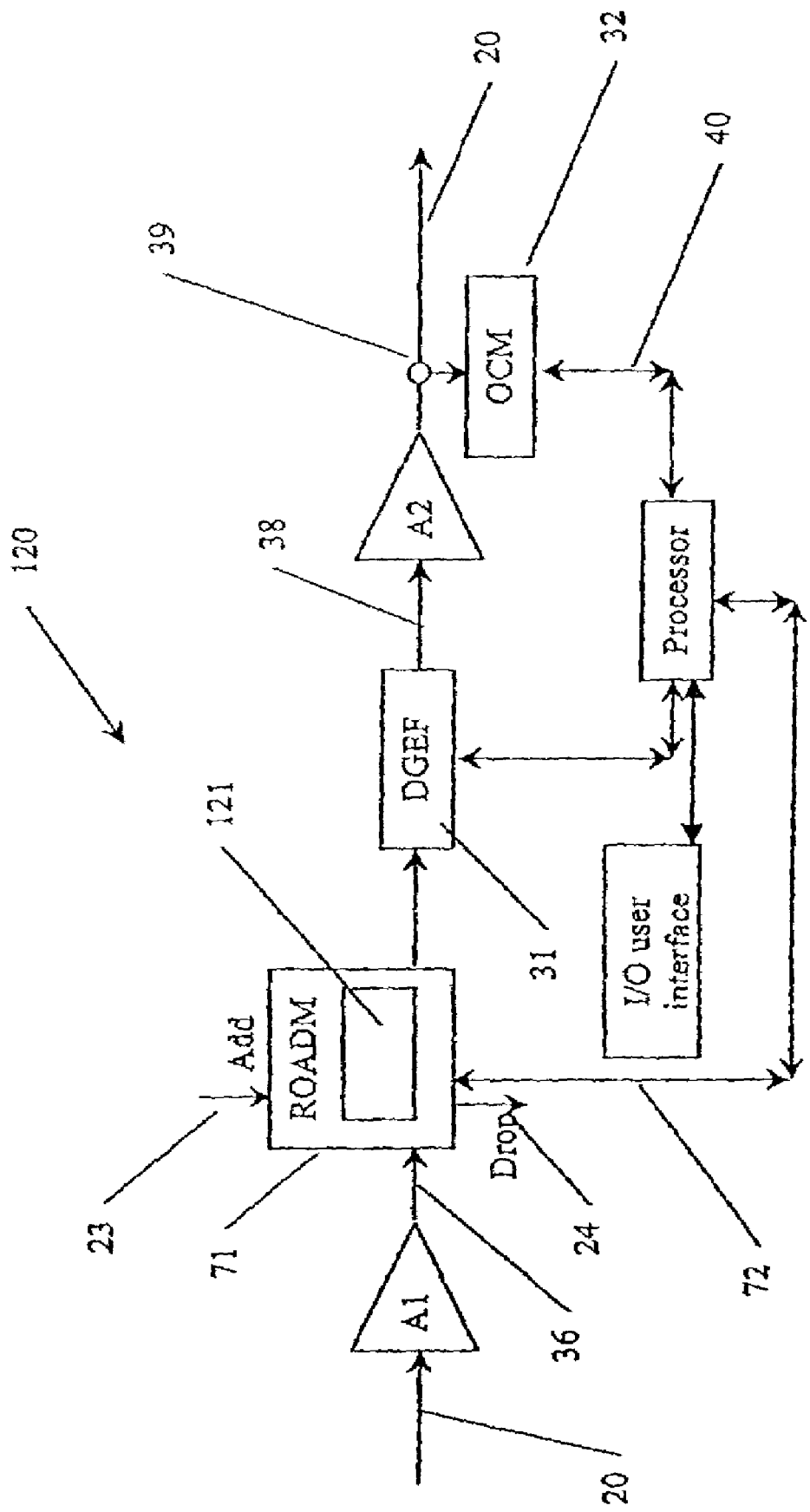
FIG. 11 is an alternative embodiment of the smart node of FIG. 6 including a wavelength conversion device in accordance with the present invention.

FIG. 11 shows a smart node generally indicated as 120 that includes a wavelength conversion device 121 optically coupled to the ROADM 71. In this particular embodiment, the smart node 120 has the ability to dynamically add channel(s) to the express line 20 regardless of their wavelength.

The wavelength conversion device 121 may comprise a tunable laser that is commanded by processor 33. The ROADM 71 comprises a device wherein the channel drop portion of a micro-mirror based device permits a single channel to be selected that will be wavelength converted and dropped from the full dense wavelength division multiplexed (DWDM) data stream from the express line 20. The tunable laser permits any new wavelength to be selected and sent out of the device.

In one aspect of this particular configuration, the OCM 32 operates as set forth herein above and provides a signal indicative of channel power and wavelength. The processor 33 then, prompted by a request or need to add another channel via ROADM 71 directs wavelength converter 121 to add the channel(s) to the express line 20 at an available wavelength. With the smart node 120 operating in this manner a channel may be added to the link 1 (FIG. 1) without conflicting with another channel already operating on the link.

In another aspect of the invention, the smart node 120 includes the capability of dropping a channel via the line 24 as described herein before. The added advantage of the wavelength converter 121 is that the processor 33 may command the conversion of any particular channel to be dropped to an appropriate wavelength for addition to another node, smart node, link or other area of a network as appropriate.

THE SCOPE OF THE INVENTION

While the foregoing invention has been described in terms of the embodiments discussed above, numerous variations are possible. Accordingly, modifications and changes such as those suggested above, but not limited thereto, are considered to be within the scope of the following claims.

The invention claimed is:

1. A smart node for use in an optical communications network having optical signals, the smart node providing continuous, real time, autonomous feedback and correction with closed and/or open loop control of the optical signals in the optical communications network, the smart node comprises:

an equalization filter for filtering the optical signals in response to a feedback processor signal;
a coupler for coupling filtered optical signals;
a channel monitor for monitoring a feedback portion of the filtered optical signals; and a processor for processing a channel monitor signal from the channel monitor, and providing the feedback processor signal to the equalization filter.

2. A smart node according to claim 1, wherein the smart node further comprises:
an input/output user interface for receiving input signals from a user and providing user input interface signals to the processor, and for receiving user output signals from the processor and providing user output interface signals to the user.

3. A smart node according to claim 1, wherein the optical signals include different wavelengths, bands or channels.

4. A smart node according to claim 1, wherein the optical signals include wavelength division multiplexed signals having various levels of power.

5. A smart node according to claim 1, wherein the equalization filter is a dynamic gain equalization filter that selectively attenuates one or more wavelengths, bands or channels to provide a dynamic gain equalization filter signal.

6. A smart node according to claim 5, wherein the dynamic gain equalization filter is either a pixelated optical filter, a Mach Zender/Fourier interference filter, acoustic filter, array waveguide or variable optical attenuator.

7. A smart node according to claim 1, wherein the channel monitor signal is indicative of a profile of the power levels of the various wavelengths, channels or bands of the optical signals.

8. A smart node according to claim 1, wherein the channel monitor is a micromirror device, an optical channel monitor (OCM), an optical channel analyzer (OCA), or optical power meter capable of accurately monitoring power levels.

9. A smart node according to claim 1, wherein the processor includes software and hardware capable of dynamically controlling the equalization filter to equalize the power spectrum of wavelengths, channels or bands entering the equalization filter.

10. A smart node according to claim 1, wherein the processor, upon receiving information from the channel monitor, provides commands to the equalization filter to selectively attenuate preselected wavelengths, channels or bands to provide a preselected spectrum output.

11. A smart node according to claim 1, wherein the processor attenuates each of the optical signals by substantially the same amount and controllably attenuates the optical signals so that the output amplifier is provided with a preselected gain profile for each of the optical signals.

12. A smart node according to claim 1, wherein the processor corrects the gain tilt of the output amplifier.

13. A smart node according to claim 1, wherein the output amplifier provides a second stage of amplification.

14. A smart node according to claim 1, wherein the coupler is an optical tap or splitter.

15. A smart node according to claim 1, wherein the channel monitor has either a band attenuation mode or a channel-by-channel mode.

16. A smart node according to claim 2, wherein the channel monitor has either a band attenuation mode or a channel-by-channel mode.

17. A smart node according to claim 16, wherein the equalization filter and the channel monitor share a common digital micro-mirror device.

18. A smart node according to claim 2, wherein the input/output user interface includes an input user interface for receiving inputs from an outside user for dynamically changing the configuration of the smart node, including timing, traffic or other distinct attribute basis.

19. A smart node according to claim 2, wherein the input/output user interface includes an output user interface for providing outputs containing information that may cause an outside user to dynamically change the configuration of the smart node.

20. A smart node according to claim 2, wherein the outputs include the power levels of various bands or channels, the band or channel spacing, channel drift, the degree of attenuation taking place, and along with other sensors or devices, the amount of dispersion/correction, empty channels, or a combination thereof.

21. A smart node according to claim 1, wherein the smart node includes a reconfigurable optical add/drop multiplexer for adding and dropping one or more of the optical signals to and from the smart node.

22. A smart node according to claim 21, wherein the processor either through programmed software, firmware, or by other means, commands the reconfigurable optical add/drop multiplexer to add certain channels and/or drop other certain channels.

23. A smart node according to claim 1, wherein the smart node comprises:
an input amplifier for amplifying the optical signals; and
an output amplifier for amplifying the filtered optical signals and providing a dynamically reconfigurable filtered and amplified output signal.

24. A smart node according to claim 1, wherein the smart node comprises:
an input amplifier for amplifying the optical signals.

25. A smart node according to claim 1, wherein the smart node comprises:
an output amplifier for amplifying the filtered optical signals and providing a dynamically reconfigurable filtered and amplified output signal.

26. A smart node according to claim 23, wherein the input amplifier, output amplifier or a combination thereof is an erbium doped fiber amplifier.

27. A smart node according to claim 23, wherein the output amplifier is arranged between the equalization filter and the coupler.

28. A smart node according to claim 27, wherein the smart node includes a reconfigurable optical add/drop multiplexer for adding and dropping one or more of the optical signals to and from the smart node.

29. A smart node according to claim 28, wherein the reconfigurable optical add/drop multiplexer is arranged between the input amplifier and the equalization filter and controlled by the processor.

30. A smart node according to claim 29, wherein the reconfigurable optical add/drop multiplexer provides subsequent equalization and other manipulation of an added channel.

31. A smart node according to claim 27, wherein the reconfigurable optical add/drop multiplexer is arranged after the coupler and controlled by the processor.

32. A smart node according to claim 27, wherein the reconfigurable optical add/drop multiplexer is arranged before the input amplifier and controlled by the processor.

33. A smart node according to claim 29, wherein the smart node includes a dispersion sensor and a dispersion compensator that combine to provide the ability to dynamically compensate for dispersion within the various bands or channels.

34. A smart node according to claim 33, wherein
the smart node includes a second coupler arranged after the coupler connected to the output amplifier;

the dispersion sensor is arranged between the second coupler and the processor, receives a small portion of the filter optical signals from the coupler, and determines the dispersion among the various channels or bands; and the dispersion compensator is arranged between the reconfigurable optical add/drop multiplexer and the equalization filter and compensates for the dispersion of the various channels.

35. A smart node according to claim 34, wherein the dispersion sensor and the dispersion compensator are controlled by the processor.

36. A smart node according to claim 34, wherein the dispersion sensor comprises a bit error rate detector, an open eye diagram or other devices suitable for detecting chromatic dispersion, polarization mode dispersion or dispersion slope.

37. A smart node according to claim 34, wherein the dispersion compensation device comprises a chromatic dispersion compensator (CDC), a polarization mode dispersion compensator (PMDC) or a dispersion slope compensator.

38. A smart node according to claim 33, wherein
the smart node includes a second coupler arranged after the coupler connected to the output amplifier;
the dispersion sensor is arranged between the second coupler and the processor, receives a small portion of the filter optical signals from the coupler, and determines the dispersion among the various channels or bands; and the dispersion compensator is arranged between the equalization filter and the output amplifier and compensates for the dispersion of the various channels.

39. A smart node according to claim 28, wherein the smart node includes a wavelength conversion device optically coupled to the reconfigurable optical add/drop multiplexer.

40. A smart node according to claim 39, wherein the wavelength conversion device provides for the ability to dynamically add a channel regardless of its wavelength.

41. A smart node according to claim 39, wherein the wavelength conversion device comprises a tunable laser controlled by the processor.

42. A smart node according to claim 39, wherein the reconfigurable optical add/drop comprises a device for providing a single channel to be selected that will be wavelength converted and dropped from a full dense wavelength division multiplexed data stream.

* * * * *

UNITED STATES PATENT AND TRADEMARK OFFICE
CERTIFICATE OF CORRECTION

| | | |
|---|---|---|
| PATENT NO. | : 7,123,833 B2 | Page 1 of 1 |
| APPLICATION NO. | : 10/216000 | |
| DATED | : October 17, 2006 | |
| INVENTOR(S) | : Szczepanek et al. | |

It is certified that error appears in the above-identified patent and that said Letters Patent is hereby corrected as shown below:

Column 6, line 35 "Micromirros" should be -- Micromirrors --

Signed and Sealed this

Twenty-third Day of March, 2010

David J. Kappos
*Director of the United States Patent and Trademark Office*